United States Patent [19]

Washizu

[11] Patent Number: 5,131,691

[45] Date of Patent: Jul. 21, 1992

[54] SNAP-FIT CONNECTOR FOR CONNECTING SLENDER PIPING MEMBERS AT END PORTIONS

[75] Inventor: Katsushi Washizu, Numazu, Japan

[73] Assignee: Usui Kokusai Sangyo Kaisha Ltd., Japan

[21] Appl. No.: 572,143

[22] Filed: Aug. 21, 1990

[30] Foreign Application Priority Data

Aug. 23, 1989 [JP] Japan .................. 1-216980

[51] Int. Cl.⁵ ............................................. F16L 37/00
[52] U.S. Cl. ...................................... 285/319; 285/921
[58] Field of Search ................................ 285/921, 319

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foults . |
| 3,588,149 | 6/1971 | Demler .................. 285/921 X |
| 3,746,376 | 7/1973 | Gold ...................... 285/921 X |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,313,628 | 2/1982 | Duenke .................. 285/921 X |
| 4,451,069 | 5/1984 | Melone . |
| 4,541,658 | 9/1985 | Bartholomew .......... 285/921 X |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,834,423 | 5/1989 | DeLand .................. 285/921 X |
| 4,842,309 | 6/1989 | LaVene et al. ......... 285/921 X |
| 4,895,396 | 1/1990 | Washizu . |
| 4,913,467 | 4/1990 | Washizu . |
| 4,915,420 | 4/1990 | Washizu . |
| 4,944,537 | 7/1990 | Usui et al. . |
| 4,946,200 | 8/1990 | Blenkush et al. ....... 285/921 X |
| 4,946,205 | 8/1990 | Washizu . |
| 4,948,176 | 8/1990 | Bartholomew ......... 285/921 X |
| 4,948,180 | 8/1990 | Usui et al. . |

FOREIGN PATENT DOCUMENTS 593413 5/1959 Italy .
855603 12/1960 United Kingdom .

Primary Examiner—Randolph A. Reese
Assistant Examiner—Timothy Aberle
Attorney, Agent, or Firm—Anthony J. Casella; Gerald E. Hespos

[57] ABSTRACT

A connector for slender piping members is disclosed. A spacer, seal rings and a bushing are inserted into the end of one piping member to be connected. The leading end portion of the one piping member is fitted in the outer circumference of the bushing. The end portion of the other piping member to be connected is pushed into the axial core of the bushing. An annular flange portion formed on the outer circumference of the other piping member is held in abutting engagement with an annular wall of a socket body, which in turn is abutted against the front face of the bushing. The circumferential wall portion of the one piping member is clamped by stepped oblique walls inside the connector body. The socket body has a plurality of elastic pawl walls projecting obliquely in the connecting direction. An annular wall formed integrally with the pawl walls is engaged by a retaining wall of the connector body. Thus, the piping members are connected by engaging the flanged wall of the piping member with the pawl walls of the socket body.

7 Claims, 2 Drawing Sheets

PRIOR ART

SNAP-FIT CONNECTOR FOR CONNECTING SLENDER PIPING MEMBERS AT END PORTIONS

BACKGROUND OF THE INVENTION

1. Field of the Invention

The present invention relates to a connector for connecting the end portions of slender piping members such as metal pipes or resin tubes and flexible hoses of a resin or rubber, or metal pipes or resin tubes and metal pipes (as will be shortly referred to as the "piping member"), both of which are so slender as to have a diameter of about 20 mm or less and are used to supply oil or air to various machines or apparatus such as automobiles.

2. Description of the Prior Art

The connector of this kind according to the prior art will be reviewed in the following. In case the piping member to be connected is a flexible hose made of a resin or rubber, as shown in FIG. 4, a flexible hose P" having undulating circumference at its back is formed with a stepped larger-diameter through chamber 22, which has a rear circumferential end portion of its cylindrical wall formed with a retaining wall 21" and extends from a communication bore formed with a connecting cylindrical wall 21' of the flexible hose P". A seal ring member is fitted in the larger-diameter through chamber 22. In the retaining wall 21" of a connector body 21 having a bushing member retained in the stepped portion of the larger-diameter through chamber 22 retaining the seal ring member, there is fitted the stepped portion of the rear end annular wall of a socket body 23 having forward oblique pawl walls at the leading end. These pawl walls are retained in engagement holes or slots which are formed in the cylindrical wall of the larger-diameter through chamber 22 at the side of the connector body 21. The bulging wall portion $P_1'$, which is fitted in the larger-diameter through chamber 22 formed in the vicinity of the portion of a piping member P' to be connected, is elastically engaged in its connected state by the aforementioned pawl wall 23'.

However, the structure of the connector of the prior art has a problem that frequent troubles are encountered in the use of a narrow piping place because the whole length of the connector is axially elongated by the fitting arrangement at the through chamber 22 and the retaining wall 21" leading to the cylindrical wall of the chamber. Moreover, the pushing connection of the flexible hose P" to the connecting cylindrical wall 21' having the undulating circumference will invite troublesomeness. Due to aging at the connected portions left outside for a long time, the gas-tightness is degraded to induce a leakage. There arises another problem that the relative sizes in the connector body 21 require a high-grade of machining accuracy.

SUMMARY OF THE INVENTION

The present invention has been conceived in view of the problems of the prior art thus far described and has an object to provide a connector for connecting the end portions of slender piping members, which is enabled to be used in a narrow piping place by shortening the total axial length of the connector, to retain the gas-tightness without fail for a long time by the use of seal rings which are sandwiched gas-tight directly between the overlapping circumferential walls in the vicinity of the ends of the connected portions, and to facilitate the connecting operations.

In order to achieve the above-specified object, according to the present invention, there is provided a connector for connecting the ends of slender piping members, in which a spacer, seal rings and a bushing are inserted into the vicinity of the end portion of one piping member to be connected. The leading end portion of the one piping member is fitted in the outer circumference of the bushing, and the vicinity of the end portion of the other piping member to be connected is pushed into the axial core of the bushing. An annular flanged portion formed on the outer circumference of the other piping member is held in abutting engagement with an annular wall, which in turn is held in abutment with the front face of the bushing. A plurality of retaining holes or slots are formed to project through the connector body the circumferential wall fitted in the one piping member. The circumferential wall portion of the one piping member is clamped by the stepped oblique walls inside of the connector body. The base of a socket body having a plurality of elastic pawl walls projecting obliquely in the connecting direction and the annular wall formed integrally with the pawl walls is engaged by the retaining wall in the connector body, whereby the one and other piping members are connected by engaging the flanged wall of the piping member side elastically by the pawl walls.

Since, according to the present invention, the spacer and the seal rings are fitted in advance in the vicinity of the end portion the one flexible hose or the expanded end portion of the metal pipe to be connected and since the bushing is inserted to position the connected portions of those piping members inside of the connector body, the connector in its entirety can be shortened in the axial direction. As a result, the connector can be easily used in a narrow place for the piping operation. At the same time, the gas-tightness can be retained for a long time without any fear of leakage by the actions of the seal rings which are hermetically sandwiched directly between the overlapping circumferential walls in the vicinity of the end portions of the piping members. Moreover, the connecting operations can be facilitated merely by engaging the base of the socket body and the retained wall through the pushing of the other piping member made of a metal or resin.

DETAILED DESCRIPTION OF PREFERRED EMBODIMENTS

Figure 1:
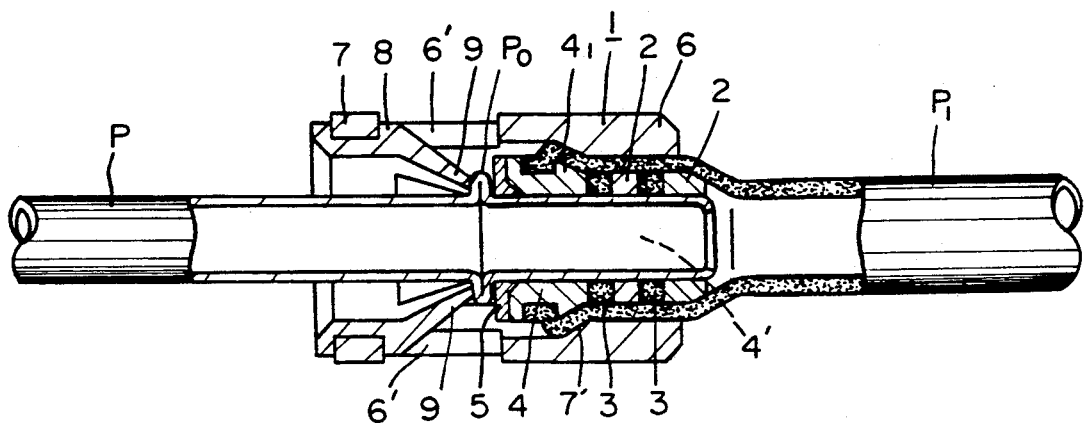
FIG. 1 is a partially cut-away longitudinal section showing the connector of the end portions of slender piping members according to one embodiment of the present invention.
Figure 2:
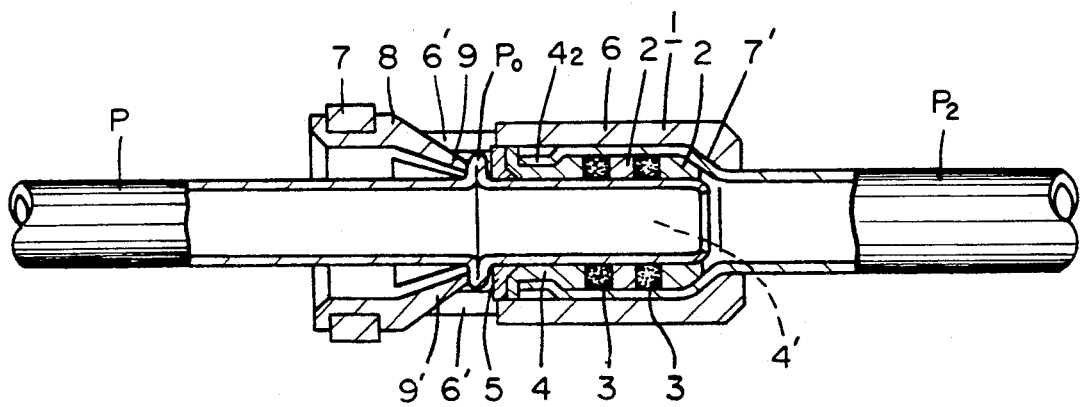
FIG. 2 is similar to FIG. 1 but shows another embodiment of the present invention.
Figure 3:
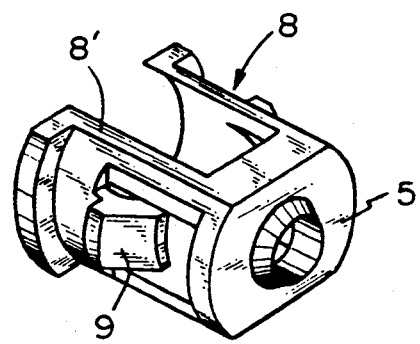
FIG. 3 is a perspective view showing a socket body itself.
Figure 4:
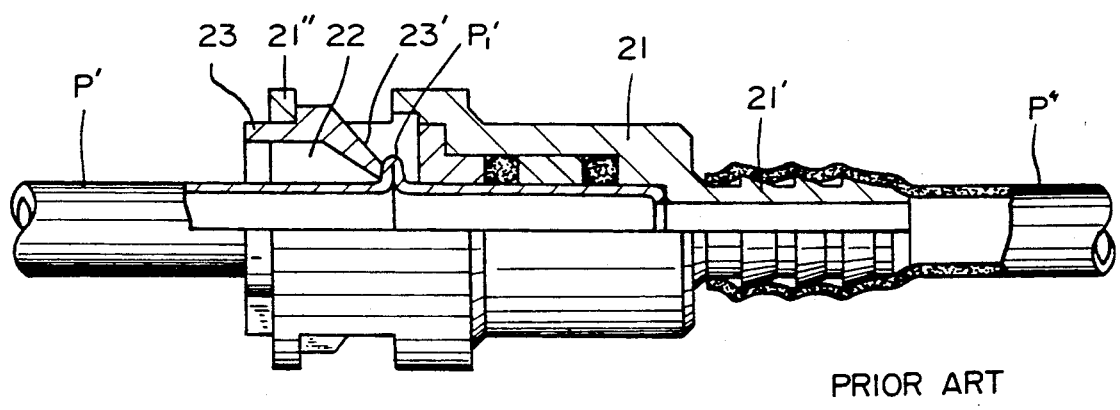
FIG. 4 is a partially cut-away longitudinal section showing the portions connected by the connector according to the prior art.

In FIGS. 1 to 3, reference numeral 1 designates a connector. Numerals 2, 3 and 4 designate an annular spacer, elastic seal rings and an annular bushing having a rising wall at its leading end, respectively. These elements 2, 3 and 4 are pushed or fitted in the vicinity of the end portion, which is to be connected, of one piping member such as a flexible hose $P_1$ (as shown in FIG. 1) made of a resin or rubber or a metal pipe $P_2$ (as shown in FIG. 2) having its end portion expanded. The piping member $P_1$ or $P_2$ has its leading end either retained on an annular ridged wall $4_1$, which is ridged from an outer circumference of the bushing 4 (as shown in FIG. 1), or caulked in an annular groove $4_2$ which is also formed in the outer circumference of the bushing 4 (as shown in FIG. 2). Reference letter P designates the other piping member made of a metal or resin. The end portion of the piping member P, which is to be connected, is pushed into an axial bore 4' of the bushing 4 until an annular flanged wall $P_0$ extending outward from the outer circumference of the piping member P comes into abutting engagement at its one side with the leading face of the bushing 4 through an annular wall 5 of a later-described socket body 8. Numeral 6 designates a connector body which is made of a metal or resin such that it is formed in its circumferential wall with a plurality of retaining holes or slots 6' and has its leading circumferential edge formed into a retaining wall 7. Moreover, the connector body 6 is assembled in advance with the aforementioned flexible hose $P_1$ or metal pipe $P_2$. The connector body 6 is formed with a stepped oblique wall 7' which is expanded to clamp the circumferential wall of the other piping member P together with the ridged wall $4_1$ of the bushing 4 or the spacer 2 located at the rearmost position. Numeral 8 designates the socket body which is made of an elastic material such that it is formed: around the axial through bore with a plurality of elastic pawl walls 9 tapered in the connecting direction; a support wall portion 8' extending in the axial direction but having different circumferential positions from those of the pawl walls 9; and the aforementioned annular wall 5 integrated with the wall portion 8'. The socket body 8 thus formed is assembled on the other piping member P in a face-to-face relation to the connector body 6. In the aforementioned abutting engagement, the rear end base of the socket body 8 is retained on the retaining wall 7 of the connector body 6, and the other side of the flanged wall $P_0$ of the other piping member P is elastically retained by the pawl walls 9 so that the other piping member P is connected to the one piping member $P_1$ or $P_2$.

Incidentally, the aforementioned annular wall 5 has a function to adjust the positioning of the connector body 6 and the socket body 8 relative to the end portion of the other piping member P. For this connection, the annular wall 5 is assembled from the end portion of the piping member P to be connected. Moreover, the retention of the retaining wall 7 is facilitated by the radial pressure and construction at the base of the socket body 8.

As has been described hereinbefore, the connector for connecting the ends of slender piping members according to the present invention effects the connection by positioning the vicinity of the end portion of the one piping member such as the flexible hose $P_1$ or the metal pipe $P_2$ in the connector body 6. Thus, the length of the connector 1 can be shortened in the axial direction. As a result, the connector can be used easily without any trouble within a narrow portion. At the same time, even a flexible hose can be held gas-tight with neither fail no fear of leakage for a long time by the action of the seal rings 3 which are fitted directly sandwiched within the connector body 6 between the overlapped circumferential walls of the end portions of the one piping member such as the flexible hose $P_1$ or the metal pipe $P_2$ and the other piping member P. Moreover, the connecting operations can be easily performed merely by pushing the one piping metal or resin member P to bring the socket 8 into engagement with the retaining wall 7 as a result of the radial pressure or construction of the base of the socket 8. Thus, it is possible to provide a remarkably useful connector for connecting slender pipes at the two end portions.

I claim:

1. A connector for connecting first and second slender piping members to each other, said first and second piping members each having end portions, said second piping member having an annular flanged wall adjacent the end portion thereof, said connector comprising:

a spacer, a seal ring and a bushing, said bushing having an axial bore and an outer circumferential portion with retaining means for retaining the end portion of said first piping member in the outer circumferential portion of said bushing, said spacer, said seal ring and said bushing being fitted in the end portion of said first piping member and over the end portion of said second piping member;

a connector body formed with an outer circumferential wall with a leading end, a rear end and a plurality of retaining holes, the circumferential wall defining, at its leading end, a retaining wall adjacent the retaining holes, and at its rear end, a stepped inwardly oblique wall for clamping said first piping member inwardly toward the second piping member; and a socket body having a leading end, an opposed base end and being formed with a plurality of elastic pawl walls projecting obliquely inwardly and toward the leading end thereof, and an annular wall formed at its leading end and having a central aperture through the annular wall, the annular wall being engaged over the end portion of said second pipe and abutting against the annular flanged wall thereof and the bushing, the pawl walls being engaged against a side of the annular flanged wall of the second pipe opposite the end portion thereof, said socket body having its base end retained in the retaining wall of said connector body, whereby said piping members are connected by holding one side of said annular flanged wall of said second pipe in abutting engagement with the annular wall of said socket body, by holding the annular wall of the socket body in abutting engagement with the bushing and by holding said elastic pawl walls in elastic engagement with the other face of said annular flanged wall of the second pipe.

2. A connector according to claim 1, wherein said first piping member is a flexible hose having its end portion expanded.

3. A connector according to claim 1, wherein said second piping member is made of a metal.

4. A connector according to claim 1, wherein said retaining means of said bushing includes an annular ridged wall.

5. A connector according to claim 1, wherein said retaining means of said bushing includes an annular groove in which the corresponding portion of said first piping member is caulked.

6. A connector according to claim 1, wherein said first piping members is a metal pipe having its end portion expanded.

7. A connector according to claim 1, wherein said second piping member is made of resin.

* * * * *